United States Patent Office 3,533,597
Patented Oct. 13, 1970

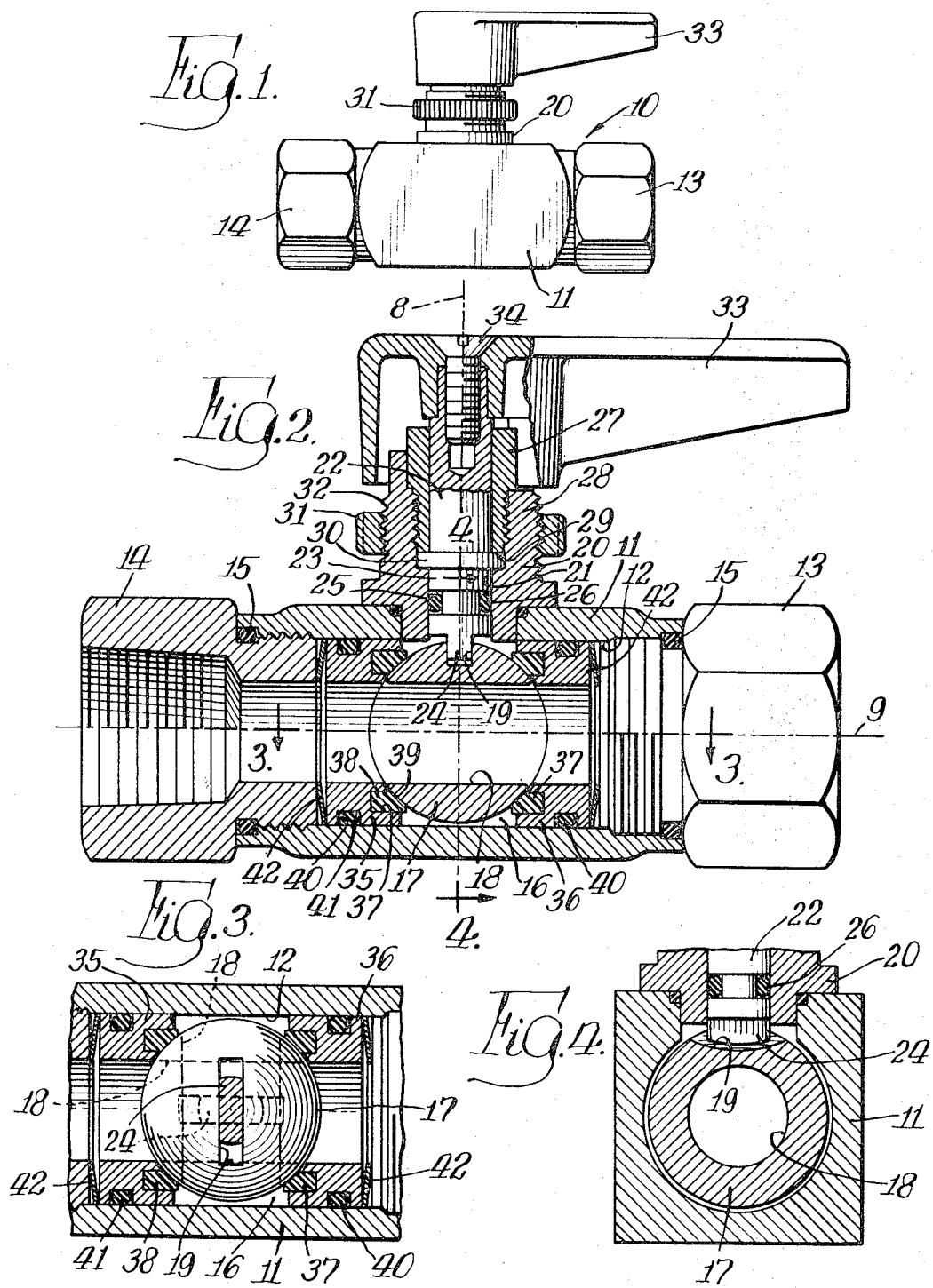

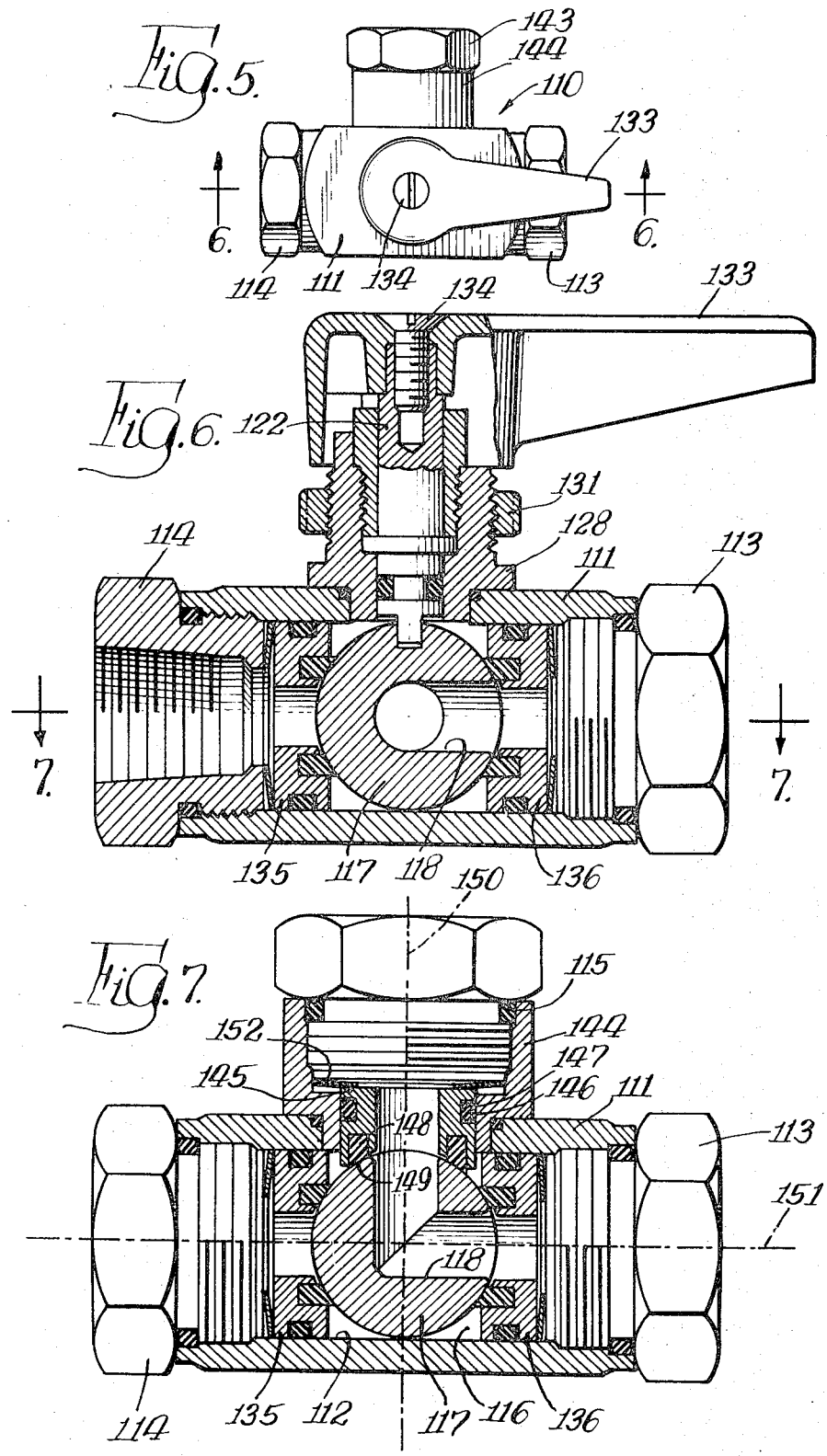

3,533,597
FLOATING SEAL BALL VALVE
Carl Bolling, Chicago, Ill., assignor, by mesne assignments, to I-T-E Imperial Corporation, Philadelphia, Pa., a corporation of Delaware
Filed Nov. 29, 1967, Ser. No. 686,428
Int. Cl. F16k 5/20
U.S. Cl. 251—174                    2 Claims

ABSTRACT OF THE DISCLOSURE

A ball valve having a ball member provided with a through flow passage and a handle means for rotating the ball member to align the through flow passage selectively with a pair of spaced openings in the body member of the valve. The ball member is sealed by a plurality of seal members carried on annular seal retainers movable within the body member and biased to urge the seal members sealingly against the ball member. In one form of the valve, the ball member is provided with a turned bore, and the body is provided with at least three spaced openings, with the ball member selectively communicating with different pairs of said spaced openings as a function of rotation of the ball member, and a third seal member is carried by a third retainer to be biased against the ball member for sealing the ball member at the third opening.

---

This invention relates to valves and, in particular, to ball valves.

A particularly vexatious problem arises in attempting to suitably seal the rotatable ball member of a ball valve in that it has been found difficult to maintain the movable seal of the ball member to the ball body over a long useful life. Such difficulty of effecting the desired seal has been found to be attributable in large measure to the inability of the ball member to be freely sealingly engaged by the seal member. The present invention comprehends an improved ball valve eliminating the discussed disadvantages of the known ball valves in a novel and simple manner.

Thus, a principal feature of the present invention is the provision of a new and improved ball valve.

Another feature of the invention is the provision of such a ball valve having new and improved means for movably sealing the ball member over a wide range of fluid pressures.

A further feature of the invention is the provision of such a ball valve wherein the sealing means is arranged to float relative to the ball member thereby to provide long lived improved sealing.

Still another feature of the invention is the provision of such a ball valve wherein the means for movably sealing the ball member includes a pair of annular seal retainers, means for movably sealing the retainers to the body for movement toward and from the ball member, a pair of annular seal members one each on the retainers confronting the ball member to be coaxially aligned with and sealingly engage the ball member about the bore thereof when the valve is in the open arrangement, and means resiliently biasing the retainers axially inwardly toward the ball member thereby to provide a substantially balanced sealing pressure by the seal members against the ball member to effectively preclude undesirable leakage of fluid pressure past the seal members.

A still further feature of the invention is the provision of such a ball valve comprising a valve wherein the body is provided with at least three openings and additional means are provided for movably sealing the ball valve member at the third opening.

Another feature of the invention is the provision of such a ball valve including new and improved resilient means for providing sealing pressure of the annular seal members against the ball member.

A yet further feature of the invention is the provision of such a ball valve wherein the annular seal members are effectively recessed within the annular retainers to provide an improved long-lived movable seal of the ball member.

Other features and advantages of the invention will be apparent from the following description taken in connection with the accompanying drawing, wherein:

FIG. 1 is a side elevation of a ball valve embodying the invention;

FIG. 2 is an enlarged diametric section thereof;

FIG. 3 is a fragmentary longitudinal section thereof taken substantially along the line 3—3 of FIG. 2;

FIG. 4 is a fragmentary transverse section thereof taken substantially along the line 4—4 of FIG. 2;

FIG. 5 is a top plan view of a three-way form of the ball valve embodying the invention;

FIG. 6 is an enlarged vertical diametric section thereof; and

FIG. 7 is a longitudinal section thereof taken substantially along the line 7—7 of FIG. 6.

In the exemplary embodiment of the invention as disclosed in FIGS. 1 through 4 of the drawing, a ball valve generally designated 10 is shown to comprise a two-way ball valve including a body 11 defining a through bore 12 having a pair of duct connectors, herein tube couplings 13 and 14, threadedly connected to the body at the opposite ends of the bore 12. As shown in FIG. 2, the couplings 13 and 14 may be sealed to the body 11 by means of suitable conventional O-rings 15. The midportion of the bore 12 between the couplings 13 and 14 defines a valve chamber 16 in which a ball member 17 is received for controlling fluid flow through the valve.

The ball member 17 is provided with a through bore 18 and a slot 19. A bonnet 20 is sealingly secured to the body 11 and is provided with an axial bore 21 opening through body 11 to the valve chamber 16. A valve stem 22 is provided with a lower end 23 coaxially rotatable in the connector bore 21 and having a depending lug 24 received in the slot 19 of the ball member 17 for rotating the ball about an axis perpendicular to the axis of the through bore 18. The stem portion 23 may be provided with an annular groove 25 in which is received an O-ring 26 for sealing the stem to the bonnet 20.

The stem 22 is retained axially in the bonnet 20 by means of a sleeve 27 threaded into an upper portion 28 of the connector and having a lower end defining a shoulder 29 bearing slidably against a collar 30 on the valve stem 22. A nut 31 may be threaded onto an exterior thread 32 of the bonnet portion 28 providing for mounting of the valve on a panel or the like. A handle 33 is connected to the upper end of the stem 22 by suitable means such as screw 34 for manually rotating the stem and, thus, the ball member 17 connected thereto.

As indicated briefly above, the invention comprehends an improved balanced sealing means for sealing the ball member 17 movably to the body 11. More specifically, the sealing means comprises a pair of annular seal retainers 35 and 36 slidably received in bore 12. Each retainer is provided with a coaxial, inwardly opening annular recess 37 in which is received an annular seal member 38 having a frusto-conical inner surface 39 sealingly engaging the ball member 17. Each seal retainer is further provided with a radially outwardly opening recess 40 in which is received a suitable O-ring 41 for sealing the retainer movably to the body 11. The retainers are biased inwardly toward the O-ring by suitable spring washers 42 removably held in the valve body by the duct connectors 13 and 14 in the assembled arrangement of the valve, as shown in FIG. 2. As the ball member 17 is thusly centered between the resiliently biased retainers 35 and 36, the ball member is effectively sealed to the body 11 by a floating seal providing long trouble-free life of the valve.

As shown in FIG. 3, when the valve is in the open position shown in full lines therein, the valve member bore 18, the annular retainers 35 and 36, and the body member bore 12 are coaxially aligned to provide an open flow passage through the valve. When the handle 33, however, is manipulated to rotate the ball member 17 about the axis of stem 22 whereby the valve member bore 18 is repositioned to be perpendicular to the axis of the retainers 35 and 36, the opening therethrough is sealingly closed. In this arrangement of the valve, should the pressure tend to move the ball member 17 away from one of the seals 38, its associated spring 42 reacts to urge the retainer to follow the ball member, and thus maintain the sealing engagement of the valve seal 38 against the ball member. Thus, the valve is reversible, providing effectively positive sealing of the ball member to the body at all times.

Further, as the seal members 38 are effectively recessed in the annular grooves 37, improved long life thereof is effectively obtained. Herein, the seal members may be formed of a suitable plastic such as Teflon (tetrafluoroethylene polymer), Buna-N rubber, Kel-F (trifluorochloroethylene polymer) and the like.

Turning now to the embodiment of FIGS. 5 through 7, a three-way valve, generally designated 110, is shown to comprise a valve generally similar to valve 10, but having a third connector 143 sealingly secured to a perpendicular portion 144 of the body 111. As shown in FIG. 7, the perpendicular connector 144 is connected to the body 111 to provide a third opening into the valve chamber 116. A third annular seal retainer 145 is provided in the connector 144 and is movably sealed thereto by a suitable O-ring 146 received in an annular groove 147 therein. The retainer 145 carries a third annular seal member 148 having a frusto-conical surface 149 engaging the ball member 117 about an axis 150 perpendicular to the axis 151 of the flow passage 112 of body 111. The flow passage 118 of the ball member 117 is L-shaped so that in one position of rotation of the ball member 117, as shown in FIG. 7, a flow passage is provided from connector 143 to connector 113. Alternatively, when the valve member 117 is rotated 90° in a counterclockwise direction from the position of FIG. 7, a flow passage is provided between connector 143 and connector 114. Thus, by suitable manipulation of the handle 133, the ball member 117 may be suitably positioned for providing fluid flow communication between connector 143 and either connector 113 or connector 114. Alternatively, should it be desired to close the valve, the ball member 117 may be rotated 180° in a counterclockwise direction from the position of FIG. 7 thereby providing a closure portion of the valve across the annular seal 148 and blocking flow through connector 143.

Retainer 145 is biased by a spring washer 152 to maintain the sealing engagement of the seal member 148 with the ball member 117. Thus, should the pressure tend to urge the ball member 117 downwardly (as seen in FIG. 7) in the closed position thereof, the seal member 148 is caused to follow the ball member and maintain its sealed engagement therewith. Alternatively, should fluid under pressure be admitted to ball passage 118 from either connector 113 or 114 while the flow path to connector 115 is blocked (as by rotating ball member 117 90° in either direction from the position of FIG. 7) seal member 148 will maintain the ball seal to prevent flow outwardly through connector 115. Thus, valve 110 is similar to valve 10 in providing a floating seal ball valve having long trouble-free life while being extremely simple and economical of construction. Except as otherwise noted above, valve 110 is similar to and functions similarly to valve 10. Elements of valve 110 which are similar to corresponding elements of valve 10 are identified by similar reference numerals except 100 higher.

I claim:

1. In a ball valve having a body defining a valve chamber having spaced openings thereto, a ball member having a through bore in said chamber, and means extending through said body and engaging said ball member for rotating said ball member to selectively align and disalign said ball member bore with said openings in correspondingly open and closed arrangements of said valve, means for movably sealing said ball member comprising: a pair of opposed, substantially rigid annular seal retainers at opposite portions of said ball member each having an annular groove opening toward said ball member parallel to the axis of said bore; O-ring means on said retainers engaging said body for movably sealing said retainers to said body with a substantially constant sealing force notwithstanding relative movement of said retainers toward and from said chamber; a pair of annular prestressed seal members one each in said annular grooves of said retainers confronting said ball member to be coaxially aligned with and sealingly engage said ball member about said bore when said valve is in the open arrangement; and means resiliently biasing said retainers axially inwardly toward said ball member thereby to provide a substantially balanced sealing pressure by said seal members against said ball member and effectively preclude undesirable leakage of fluid pressure past the seal members, said biasing means including a pair of coaxial nut members threaded to the body at opposite sides of said valve chamber outwardly of said retainers, a spring washer between each nut member and retainer engaging the retainer at a radially outermost portion of the retainer longitudinally outwardly of the outermost portion of said means for sealing the retainer to the body, and means on said body and nut members for limiting the position of the nut members to provide preselected pressure of said seal members against said ball member, said grooves being disposed substantially midway between the radially inner and outer portions of said annular retainers immediately adjacent the ball member.

2. The ball valve means of claim 1 wherein said seal members have a thickness perpendicular to the axis of said ball member bore approximately one-half the corresponding thickness of said retainers.

References Cited

UNITED STATES PATENTS

| 2,932,311 | 4/1960 | Scherer | 251—315 X |
| 3,091,428 | 5/1963 | Magos | 251—174 X |
| 3,157,190 | 11/1964 | Allen | 251—315 X |
| 3,235,224 | 2/1966 | Grove | 251—174 |
| 3,386,699 | 6/1968 | Petter et al. | 251—315 |
| 3,414,233 | 12/1968 | Priese et al. | 251—174 |
| 2,868,498 | 1/1959 | Kaiser | 251—315 X |
| 3,211,420 | 10/1965 | Hartmann | 251—315 X |

FOREIGN PATENTS

| 1,427,882 | 1/1966 | France. |
| 1,437,878 | 3/1966 | France. |

M. CARY NELSON, Primary Examiner

M. O. STURM, Assistant Examiner